United States Patent
Larson

(10) Patent No.: US 6,783,478 B2
(45) Date of Patent: Aug. 31, 2004

(54) COMPOUND DIFFERENTIAL PLANETARY GEAR ASSEMBLY

(75) Inventor: Lowell V. Larson, Huntington Beach, CA (US)

(73) Assignee: Moog Inc., East Aurora, NY (US)

( * ) Notice: Subject to any disclaimer, the term of this patent is extended or adjusted under 35 U.S.C. 154(b) by 0 days.

(21) Appl. No.: 10/244,720

(22) Filed: Sep. 13, 2002

(65) Prior Publication Data

US 2004/0053739 A1 Mar. 18, 2004

(51) Int. Cl.[7] .............................................. F16H 57/08
(52) U.S. Cl. ........................ 475/331; 475/330; 475/332; 475/342
(58) Field of Search .............................. 475/330, 331, 475/332, 338, 341, 342, 903

(56) References Cited

U.S. PATENT DOCUMENTS

| | | | | |
|---|---|---|---|---|
| 3,008,355 A | * | 11/1961 | Grudin | 475/342 X |
| 3,473,416 A | * | 10/1969 | Pope et al. | 475/342 X |
| 4,721,016 A | * | 1/1988 | Burandt | 475/342 |
| 4,742,730 A | * | 5/1988 | Dorn et al. | 475/332 |
| 4,751,855 A | * | 6/1988 | Hudson | 475/332 X |
| 4,768,400 A | * | 9/1988 | McKay | 475/330 |
| 4,825,723 A | * | 5/1989 | Martin | 475/332 |
| 4,932,613 A | * | 6/1990 | Tiedeman et al. | 475/342 X |
| 5,106,354 A | * | 4/1992 | Russ et al. | 475/342 |

FOREIGN PATENT DOCUMENTS

JP     403014951   *  1/1991  ................. 475/341

* cited by examiner

Primary Examiner—Ha Ho
(74) Attorney, Agent, or Firm—Phillips Lytle LLP

(57) ABSTRACT

A compound differential planetary gear assembly (50) includes a sun gear (52), a plurality of planet gears (53) engaging the sun gear, a plurality of first ring gears (54), and a plurality of second ring gears (55). Each of the second ring gears has a number of teeth that is different from the number of teeth of the first ring gears. The first and second ring gears are arranged alternately in an axial stack. Each planet gear has a constant gear-tooth cross-section along the length of the stack, with its gear teeth in meshing engagement with the teeth of the first and second ring gears. Loads transmitted between the first and second ring gears and the planets act in alternate directions along the length of the stack.

9 Claims, 2 Drawing Sheets

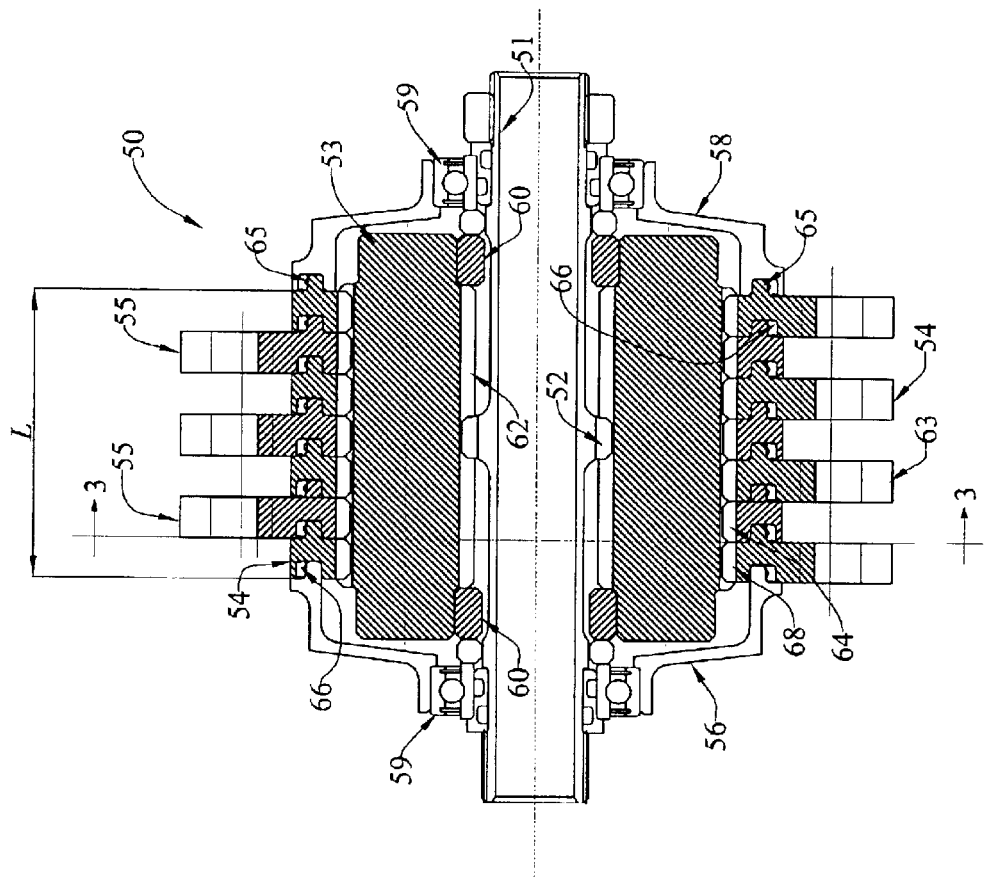
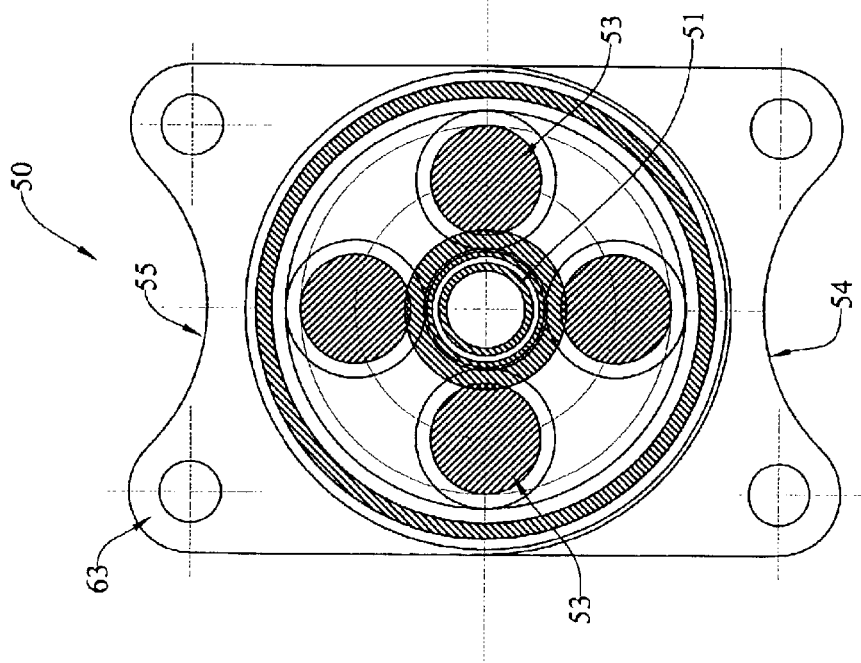

COMPOUND DIFFERENTIAL PLANETARY GEAR ASSEMBLY

TECHNICAL FIELD

The present invention relates generally to compound differential planetary gear assemblies, and, more particularly, to improved compound differential planetary gear assemblies in which first and second ring gears are arranged alternately in an axial stack, and wherein each planet gear has a constant gear-tooth cross-section along the length of this stack in meshing engagement with each of the first and second ring gears such that loads transmitted between the ring and planet gears will act in alternate directions along the length of the stack.

BACKGROUND ART

Compound differential planetary or epicyclic gear trains are known. Basically, these devices include a central sun gear, a plurality of planet gears arranged to rotate about the sun gear, and at least two outer ring gears in meshing engagement with the planet gears. Such planetary gearing may be used, for example, to transmit relatively high torques between the ring gears.

Compound differential planetary gear assemblies have been used as an actuating hinge. One application has been to control an aircraft flap surface with respect to a wing structure. In practice, such a prior art arrangement has an input shaft operatively arranged to drive a sun gear, a plurality of planet gears arranged to rotate about the sun gear, and first and second ring gears in meshing engagement with the planet gears. The first and second ring gears have different numbers of teeth such that, as the sun gear is rotated, the differential number of teeth causes one ring gear to move relative to the other ring gear. In this prior art arrangement, the planet gears are formed with gear teeth portions having different pitch diameters, depending upon the particular ring gear they are adapted to engage. This type of planet gear is expensive to manufacture because of the different gear teeth that must be hobbed thereon at different portions of its axial extent. Moreover, this arrangement, with relatively large axial separation between the alternating loads on the planet gear shaft, causes bending of the shaft and necessitates crowning of the gear teeth in order to attain high torques.

U.S. Pat. No. 4,942,781, the aggregate disclosure of which is hereby incorporated by reference, discloses a form of differential planetary gear assembly having a sun gear, a plurality of planet gears, and a plurality of ring gears. The ring gears have different numbers of teeth. As shown in FIG. 3 of this patent, the planet gears have a constant gear-tooth cross-section along the portion that is engaged with the two ring gears. This is possible by modifying the tooth pitch of the ring gears to mesh with a constant tooth pitch on the planetary gears. This techniques is utilized in the following described invention.

Accordingly, it would be desirable to provide an improved compound differential planetary gear assembly that permits the use of planet gears that have a constant gear-tooth cross-section along the portion thereof that is in meshing engagement with the ring gears, and that distributes the load along the length of the alternating ring gear segments.

DISCLOSURE OF THE INVENTION

With parenthetical reference to the corresponding parts, portions or surfaces of the disclosed embodiment, merely for purposes of illustration and not by way of limitation, the present invention broadly provides an improved compound differential planetary gear assembly (50).

The improved gear assembly broadly includes a sun gear (52), a plurality of planet gears (53) engaging the sun gear, a plurality of first ring gears (54), and a plurality of second ring gears (55). Each of the second ring gears has a number of teeth different from that of the first ring gears. The first and second ring gears are arranged alternately in an axial stack. Each planet gear has a constant gear-tooth cross-section (62) along the length of the stack in meshing engagement with each of the first and second ring gears. Loads transmitted between the first and second ring gears and the planets will therefore be distributed and act in alternate directions along the length of the stack.

The assembly may further comprise a plurality of separator rings (60) operatively arranged between the planet gears at each end of the stack. Each ring gear may have an annular bearing tongue (65) that extends toward an adjacent ring gear in a stack, with the adjacent ring gear having an annular bearing groove (66) to receive such tongue. The housing may have an annular bearing tongue, and the ring gear positioned adjacent the housing may have an annular bearing groove adapted to be receive such housing tongue. The housing may also have an annular bearing groove, such that the ring gear positioned adjacent that housing will have an annular bearing tongue that is adapted to extend into such housing groove. The plurality of the first ring gears may be different from the plurality of the second ring gears.

Accordingly, the general object of this invention is to provide an improved compound differential planetary gear assembly.

Another object is to provide an improved compound differential planetary gear assembly having a plurality of first and second ring gear sections arranged alternately in an axial stack so as to distribute the load along the stack and along the meshing elongated planet gears so as to prevent bending of the planet gears, and the concomitant need for crowning of the gear teeth.

Still another object is to provide an improved compound differential planetary gear assembly in which each planet gear has a constant gear-tooth cross-section along the length of such stack in meshing engagement with each of the first and second ring gears.

These and other objects and advantages will become apparent from the foregoing and ongoing written specification, the drawings, and the appended claims.

BRIEF DESCRIPTION OF THE DRAWINGS

FIG. 2 is a fragmentary vertical sectional view of the improved compound differential planetary gear assembly, albeit not necessarily to the same scale as the prior art arrangement depicted in FIG. 1, this view showing the improved gear assembly as including a plurality of alternating first and second ring gears arranged in an axial stack and with a plurality of planetary gears having constant gear-tooth cross-sections along the length of this stack.

FIG. 3 is a fragmentary transverse vertical sectional view thereof taking generally on line 3—3 of FIG. 2.

DESCRIPTION OF THE PREFERRED EMBODIMENTS

Figure 1:
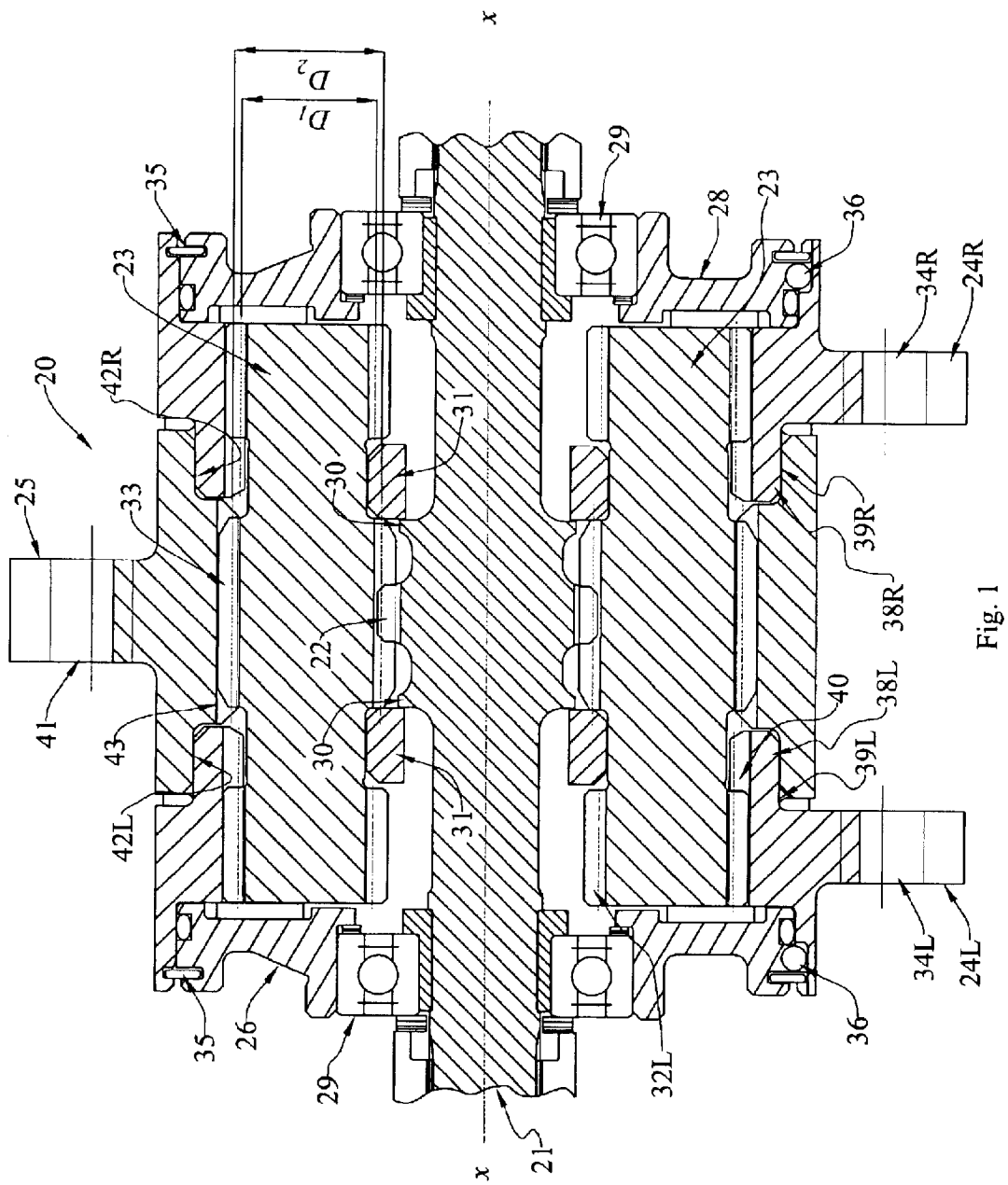
FIG. 1 is a fragmentary vertical sectional view of a prior art compound differential planetary gear assembly having a sun gear, a plurality of planet gears, and first and second ring gears.

At the outset, it should be clearly understood that like reference numerals are intended to identify the same structural elements, portions or surfaces consistently throughout the several drawing figures, as such elements, portions or surfaces may be further described or explained by the entire written specification, of which this detailed description is an integral part. Unless otherwise indicated, the drawings are intended to be read (e.g., cross-hatching, arrangement of parts, proportion, degree, etc.) together with the specification, and are to be considered a portion of the entire written description of this invention. As used in the following description, the terms "horizontal", "vertical", "left", "right", "up" and "down", as well as adjectival and adverbial derivatives thereof (e.g., "horizontally", "rightwardly", "upwardly", etc.), simply refer to the orientation of the illustrated structure as the particular drawing figure faces the reader. Similarly, the terms "inwardly" and "outwardly" generally refer to the orientation of a surface relative to its axis of elongation, or axis of rotation, as appropriate.

Prior Art Gear Assembly (FIG. 1)

Referring now to the drawings, and, more particularly, to FIG. 1 thereof, a pnor art compound differential planetary gear assembly is generally indicated at 20. This gear assembly is shown as having a horizontally-elongated central shaft 21 provided with a sun gear 22; a plurality of planet gears, severally indicated at 23; and first and second ring gears 24L, 24R, and 25, respectively.

Shaft 21 is arranged to be selectively rotated about axis x—x by a suitable mechanism (not shown). The shaft is mounted on a housing, left and right portions of which are indicated at 26, 28, respectively. The shaft is journaled on the housing by means of bearings, severally indicated at 29, operatively interposed between the shaft and housing portions 26, 28, respectively. The central portion of the shaft is shown as having formed thereon the externally-threaded sun gear 22. A projection 30 extends radially outwardly from the shaft on either side of the sun gear. These projections are axially-spaced from one another and from the sun gear, and function to held separator rings, 31, 31, in axially-spaced relation to the sun gear.

Still referring to FIG. 1, each planetary gear is shown as being a horizontally-elongated specially-configured shaft-like member 23. Each planet is shown as having a leftward toothed portion 32L of one pitch diameter ($D_1$) arranged to engage left ring gear 24L, an intermediate gear portion 33 of a greater pitch diameter ($D_2$) arranged to engage the central or second ring gear 25, and a rightward toothed portion 32R substantially of the same pitch diameter ($D_1$) as left toothed portion 32L and arranged to engage rightward ring gear 24R. In FIG. 1, each planet gear is shown as being a solid member. However, in practice, these could be hollow, and provided with suitable lubrication ports and the like.

The leftward ring gear 24L is shown as being a specially-configured annular member having an outwardly-extending portion 34L which is adapted to be connected to some structure (not shown). Loft ring gear 24L is retained on housing portion 26 by means of a retaining ring 35 and a bearing 36. Alternatively, a lock ball could be used. Ring gear 24L has a rightwardly-extending projection 38L having a bearing surface 39L engaging second ring gear 25. Ring gear 24L also has a plurality of inwardly-extending gear teeth, indicated at 40, in meshing engagement with planet gear toothed portion 32L.

Right ring gear 24R is substantially a mirror image of the structure previously described. Hence, the same reference numeral, albeit annotated with the suffix "R" rather than "L", is used to indicated the corresponding structure in ring gear 24R.

The central ring gear 25 is shown as having a portion 41 provided with a mounting hole by which the second ring might be connected to other structure (not shown). The second ring gear is shown as being an annular member having a leftward bearing surface 42L arranged in bearing relation to first ring gear bearing surface 39L, and as having a second bearing surface 42R arranged in bearing relation to right ring gear bearing surface 39R. This second ring gear also has a plurality of gear teeth, severally indicated at 43, in meshing engagement with planet gear teeth 33. The number of gear teeth on the first ring gears, 24L, 24R, and on the second ring gear 25, are different from one another such that when the sun gear is rotated about its axis, angular movement will occur between the first and second ring gears. In another arrangement, the ring gears could have the same number of teeth, and the planet could have different numbers of teeth engaged with these ring gears.

As indicated above, in this prior art arrangement, the planet gears are formed to have tooth portions of different pitch diameter to engage the various ring gears. This is relatively expensive to manufacture. Moreover, the loads transmitted between the ring gears act oppositely between the center and ends of the planet gear shafts, causing bending of the planet gear shaft and the need for crowning of the teeth.

Improved Gear Assembly (FIG. 2)

Referring now to FIG. 2, an improved compound differential planetary gear assembly is generally indicated at 50. This arrangement is shown as having a central shaft 51 provided with a sun gear 52; aplurality of planet gears, severally indicated at 53; and a plurality of first and second ring gear segments, 54, 55, respectively, arranged in an alternating series in an axial stack of length L. The shaft is mounted in a housing having a left part 56 and a right part 58. The shaft is mounted for rotation about axis x—x within the housing parts by means of bearings 59, 59, respectively. A separator ring, indicated at 60, is operatively arranged between the several planet gears at each end of the stack.

In this improved embodiment, the planet gears are shown as being horizontally-elongated shaft-like members provided with a constant gear-tooth cross-section 62 along the length of the stack that is engaged with the ring gears. Thus, the pitch diameter ($D_1$) is the same.

Each ring gear 54 has a portion 63 that contains mounting holes by means of which the ring gear may be attached to other structure. Each ring gear 54 is an annular member having inwardly-extending gear teeth 68 in meshing engagement with planet gear teeth 62. Each ring gear 54 has an annular bearing tongue 65 extending toward the immediately rightwardly-adjaeent ring gear, and has a leftwardly-facing annular grove 66 adapted to receive the tongue of the adjacent structure.

Ring gears 55 are substantially the same as ring gears 54, although in the preferred embodiment, they are arranged 180° out-of-phase with respect to ring gears 54. Here again, ring gears 55 have teeth 64 in meshing engagement with planet teeth 62. The number of teeth on ring gears 55 is different from the number of teeth on ring gears 54, and the circular pitch of each ring gear is modified to permit meshing with the common circular pitch of the planet gears.

Therefore, the improved compound differential planetary gear assembly broadly includes the sun gear, a plurality of planet gears engaging the sun gear, a plurality of first ring gears, and a plurality of second ring gears. Each of the second ring gears has a number of teeth that is different from that of the first ring gears. The first and second ring gears are arranged alternately in an axial stack so as to distribute the alternating loads transmitted between the first and second ring gears and the planet gears along the length of the stack.

This distribution reduces bending of the planet gears, and eliminates the need for crowning of the teeth. Each planet gear has a constant gear-tooth cross-section along the length of the stack, with such gear tooth portion being in meshing engagement with each of the first and second ring gears. This constant gear-tooth cross-section reduces the cost of manufacturing the planet gears, and hence reduces the overall cost of the system.

The separator ring 60 is operatively arranged between the planet gears and each end of the stack. As indicated above, each ring gear has an annular bearing tongue 65 that extends toward an adjacent ring gear, and the adjacent ring gear has an annular bearing groove 66 to receive the tongue of its immediate leftward neighbor. The housing portions at the respective ends of the stack have tongues and grooves respectively, to accommodate the grooves and tongues, respectively, of the leftwardmost and rightward most rings. In the preferred embodiment, the number of first ring gears differs from the number of the second ring gears, preferably by one. However, in an alternative arrangement, the number of ring gears could be changed or modified, as desired.

Modifications

The present invention contemplates that many changes and modifications may be made. For example, while the present arrangement shows a planetary gear assembly having four planet gears, a different number of planet gears could be used. The particular configuration of the ring gear segments may be changed as desired, particularly with respect to the location of the bearing tongues and grooves, and the number of each in any particular stack may also be changed or modified. However, it is presently preferred that the ring gear segments be arranged alternately in the axis of the stack. The structure and configuration of the planet gears may also be changed, as desired.

Therefore, while the presently-preferred form of the improved compound differential planetary gear assembly has been shown and described, and several modifications and changes thereof discussed, persons skilled in this art will readily appreciate the various additional changes and modifications that may be made without departing from the spirit of the invention, as defined and differentiated by the following claims.

What is claimed is:

1. A compound differential planetary gear assembly, comprising:

a sun gear;

a plurality of planet gears engaging said sun gear;

a plurality of first ring gears engaging said planet gears, each of said first ring gears being connected to a common first member;

a plurality of second ring gears engaging said planet gears, each of said second ring gears having a number of teeth different from those of said first ring gears;

said first and second ring gears being arranged alternately and immediately adjacent one another and separated only be intermediate bearings in an axial stack;

each planet gear having a constant gear-tooth cross-section along the length of said stack in meshing engagement with each of said first and second ring gears;

whereby loads transmitted between said first and second ring gears will act in alternate directions along the length of said stack.

2. A compound differential planetary gear assembly as set forth in claim 1 and further comprising at least one separator ring operatively arranged between said planet gears.

3. A compound differential planetary gear assembly as set forth in claim 1 wherein each ring gear has an annular bearing tongue that extends toward an adjacent ring gear, and wherein said adjacent ring gear has an annular bearing groove to receive said tongue.

4. A compound differential planetary gear assembly as set forth in claim 1 and further comprising a housing having an annular bearing tongue, and wherein the ring gear positioned adjacent said housing has an annular bearing groove to receive said tongue.

5. A compound differential planetary gear assembly as set forth in claim 1 and further comprising a housing having an annular bearing groove, and wherein the ring gear positioned adjacent said housing has an annular bearing tongue adapted to extend into said groove.

6. A compound differential planetary gear assembly as set forth in claim 1 wherein the plurality of said first ring gears is different from the plurality of second ring gears.

7. A compound differential planetary gear assembly as set forth in claim 1 wherein each of said first and second ring gears having different thicknesses.

8. A compound differential planetary gear assembly as set forth in claim 1 wherein each first ring gear has an annular bearing tongue that extends toward and adjacent second ring gear, and wherein said adjacent second ring gear has an annular bearing groove in which said tongue is received.

9. A compound differential planetary gear assembly as set forth in claim 1 wherein each of said second ring gears is connected to a common second member.

* * * * *